Nov. 21, 1933.  P. M. WOLF  1,935,926
UNIVERSAL JOINT
Filed Nov. 9, 1931
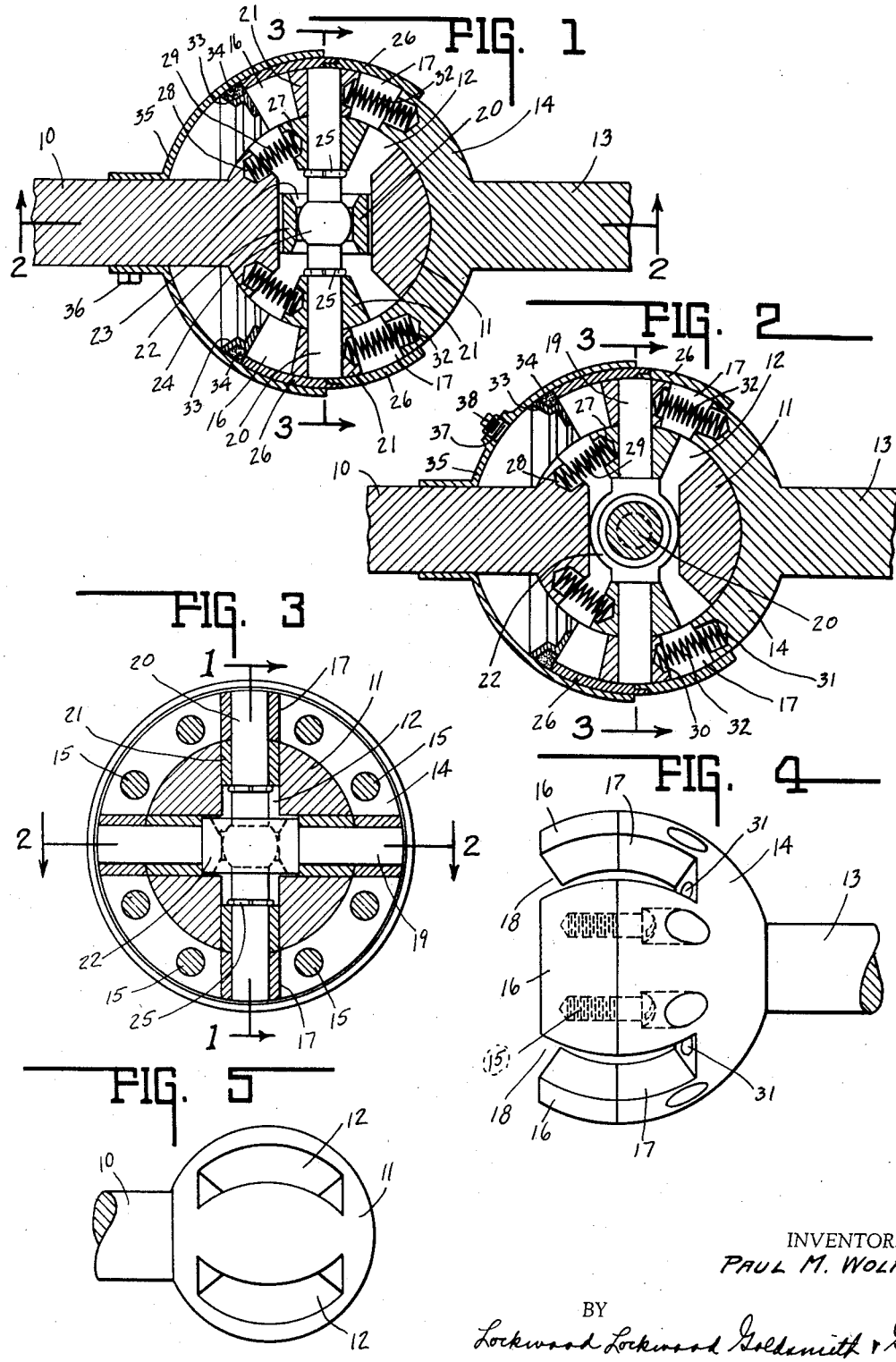
INVENTOR.
PAUL M. WOLF.
BY
Lockwood Lockwood Goldsmith & Galt
ATTORNEYS.

Patented Nov. 21, 1933

1,935,926

UNITED STATES PATENT OFFICE 1,935,926

UNIVERSAL JOINT

Paul M. Wolf, Indianapolis, Ind.

Application November 9, 1931. Serial No. 573,776

2 Claims. (Cl. 64—91)

This invention relates to a universal joint, and more particularly to the class of universal joints designed to impart rotation from one rotatable member to another while maintaining the angular velocity of one equal to the angular velocity of the other throughout each revolution.

The principal object of the present invention is to produce a universal coupling of this type which is relatively simple and inexpensive to manufacture and which is capable of transmitting relatively large loads on a small size of coupling.

The principal feature of the invention resides in the provision of a ball attached to one rotatable member, a socket attached to the other rotatable member and a pair of transversely arranged pins engaging slotted openings in the said ball and socket. The said pins are arranged with their axes transverse to each other and one of said pins passes through a suitable opening in the other, the said pins being so formed at their point of contact that a universal relation is maintained therebetween.

Another feature of the invention resides in the provision of springs normally urging the pins toward a central position in the said slotted openings for a purpose to be hereinafter described.

Other objects and features of the invention will be understood from the accompanying drawing and the following description and claims:

Figure 1 is a central sectional view of the universal joint taken on the line 1—1 of Figure 3. Figure 2 is a central sectional view taken on the line 2—2 of Figures 1 and 3. Figure 3 is a lateral sectional view taken on the line 3—3 of Figures 1 and 2. Figure 4 is an elevational view in detail of the socket member alone. Figure 5 is a similar view of the ball member.

A rotatable shaft 10 has formed thereon a ball 11 in which there are formed a plurality of slotted openings 12, four in number, arranged longitudinally with respect to the axis of rotation of the shaft 10. A second rotatable shaft 13 has formed thereon a socket consisting of a hemispherical portion 14 to which is attached, by means of screws 15, a plurality of segments 16. The socket portion 14 and segments 16 are formed with a spherical inner surface adapted to grasp the ball 11 and are also provided with a spherical outer surface. The socket portion 14 is formed with slotted openings 17, four in number, arranged longitudinally with respect to the axis of rotation of the shaft 13. The said slotted openings are continued by the openings 18 between the segments 16.

A pair of pins 19 and 20 having cylindrical ends extending through the slotted openings 12, 17 and 18 are fitted with anti-friction blocks 21 surrounding the cylindrical portions of the same and bearing upon the longitudinal walls of the said openings. The pin 19 is formed with an enlarged central portion 22 substantially cylindrical in form. The outer surface of the portion 22 engages the inner surface of the ball 11, as best shown in Figure 2, and serves to maintain the axis of the pin 19 upon a plane passing through the center of the said ball. The enlarged portion 22 is formed with a central opening 23, best shown in Figure 1, through which the pin 20 passes. The pin 20 is formed with an enlarged spherical portion 24, best shown in Figure 1, which engages the inner wall of the opening 23 and serves to maintain the axis of the pin 20 also in a plane passing through the center of the ball 11. Thus a true universal relation is maintained between the ball and the axes of the two pins. A pair of spring collars 25 are placed in suitable grooves in the pin 20 and serve to maintain the anti-friction blocks 21 in their proper position. A pair of retaining members 26 are fastened to the outer surface of the socket 14 and segments 16 and serve to maintain the pins 19 and 20 and the anti-friction blocks 21 within the joint. The said retaining members also serve to retain a supply of grease.

Each of the inner retaining blocks 21 has formed therein a spring seat 27, and similar spring seats 28 are formed in the adjacent portions of the ball 11. Compression springs 29 are interposed between the spring seats 27 and 28. The outer anti-friction blocks 21 are formed with spring seats 30, and the adjacent portions of the socket 14 are fitted with similar spring seats 31. Compression springs 32 are interposed between the spring seats 30 and 31. By this means the springs 29 urge the pins 19 and 20 in one direction while the springs 32 similarly urge the pins in the opposite direction with the result that the pins are normally centered in the slotted openings 12, 17 and 18. If the springs 29 and 32 were omitted and if the shafts 10 and 13 were at rest and in perfect alignment, there would be a possibility of the pins being moved to one end or the other of the said slotted openings. If then an attempt were made to move the shafts out of alignment, the pins would lock and prevent such movement. The provision of the springs 29 and 32, therefore, prevents this locking action by continually maintaining the pins in their central position when the shafts are at rest and in line.

When the shafts are not in alignment, the axes of the slotted openings in the ball and socket intersect at an angle instead of coinciding and the axes of the pins are retained at the intersections of the openings without the aid of the springs.

A packing retainer 33 is fastened to the outer edges of the segmental portions 16 of the socket and carries a packing ring 34 of felt or other suitable material. A grease retaining shell 35 is fastened by a set screw 36 to the shaft 10 and has its spherical inner surface engaged by the packing ring 34. A threaded opening 37 is provided in the shell 35 through which a supply of grease may be introduced and which may then be closed by a plug 38 for retaining the said grease. The packing ring 34 cooperating with the inner surface of the shell 35 prevents the escape of the grease.

In the operation of the universal coupling described herein, when the shafts 10 and 13 are not in alignment, the axes of the slotted openings 12, 17 and 18 intersect in a plane bisecting the angle formed by the axes of the shafts. The axes of the pins 19 and 20 are therefore maintained in this bisecting plane. Thus, the condition necessary for the transmission of a uniform angular velocity is maintained. The fact that the pins are not rigidly connected to each other insures that each pin carries its proportionate share of the load without the necessity of an absolutely accurate fit between the pins and anti-friction blocks and between the anti-friction blocks and the sides of the slotted openings. The fact that both pins extend completely through the ball increases the load carrying capacity of the pins without materially weakening the ball itself. The provision of the grease retaining shell with the internal packing ring dispenses with the use of the usual leather grease retainer which ordinarily requires frequent replacement and which can not be conveniently refilled, and at the same time, does not add materially to the outside dimensions of the coupling.

The invention claimed is:

1. A universal joint for connecting a pair of rotatable members including a ball associated with one of said members and having a plurality of slotted openings arranged longitudinally with respect to the axis of rotation of its associated rotatable member, a socket associated with the other of said rotatable members, said socket grasping and retaining said ball and having a plurality of slotted openings arranged longitudinally with respect to the axis of rotation of its associated rotatable member, and a pair of pins arranged with their axes transverse to each other and one of said pins passing through a central opening in the other of said pins and each end of each of said pins passing through one of the slotted openings in said ball and one of the slotted openings in said socket, and said second mentioned pin having an enlarged portion curved in form and located substantially midway between its ends, said portion engaging the interior surface of said ball at two points substantially diametrically opposed for maintaining a universal relation between said pin and ball.

2. A universal joint for connecting a pair of rotatable members inclding a ball associated with one of said members and having a plurality of slotted openings arranged longitudinally with respect to the axis of rotation of its associated rotatable member, a socket associated with the other of said rotatable members, said socket grasping and retaining said ball and having a plurality of slotted openings arranged longitudinally with respect to the axis of rotation of its associated rotatable member, and a pair of pins arranged with their axes transverse to each other and one of said pins passing through a central opening in the other of said pins and each end of each of said pins passing through one of the slotted openings in said ball and one of the slotted openings in said socket, said second mentioned pin having a center portion restrained against movement in either direction parallel to the axis of said first rotatable member by contact with interior surfaces of said ball.

PAUL M. WOLF.